Feb. 17, 1970  K. G. KING ET AL  3,496,444

VOLTAGE CONVERTER CIRCUITS

Filed Dec. 26, 1967  3 Sheets-Sheet 1

United States Patent Office 3,496,444
Patented Feb. 17, 1970

3,496,444
VOLTAGE CONVERTER CIRCUITS
Kenneth G. King and Derek E. Burch, London, England, assignors to Westinghouse Brake and Signal Company, Limited, London, England
Filed Dec. 26, 1967, Ser. No. 693,632
Claims priority, application Great Britain, Jan. 24, 1967, 3,528/67
Int. Cl. H02m 3/22, 5/40
U.S. Cl. 321—2       12 Claims

ABSTRACT OF THE DISCLOSURE

A D.C. chopper regulator for the purpose of effecting a fixed ratio or slightly adjustable conversion from one D.C. voltage to another is provided with two or more circuits operating in parallel but staggered in time so that ripple both at the input and output terminals is considerably reduced for a given weight of smoothing components.

---

This invention relates to voltage converter circuits.

According to the present invention there is provided a voltage converter circuit including a plurality of inductances and respective switching means via which the inductances are switchable in turn in respective series paths across direct current supply terminals, free-wheeling paths being provided for currents in the inductances, the turning on of one of said switching means being accompanied closely by the turning off of the previously conducting switching means such that a rising output ripple voltage component due to the one switching means being conducting is accompanied by a substantially complementary falling output ripple voltage component due to the previously conducting switching means having been conducting.

The inductances may be connectable via the respective switching means in a series path including a capacitor across which an output voltage is derived to produce an output voltage less than that at the supply terminals or alternatively, the respective switching means may be operable when conducting to permit rising current in the respective inductance and energy may be stored in the inductances during conduction of the respective switching means being transferred via the respective free-wheeling current paths to a capacitance across output terminals to produce an output voltage greater than that at the supply terminals.

Boost transformer means may be provided for boosting or partially bucking the output voltage by supplementing the voltage in the respective free-wheeling current paths.

Figure 1:
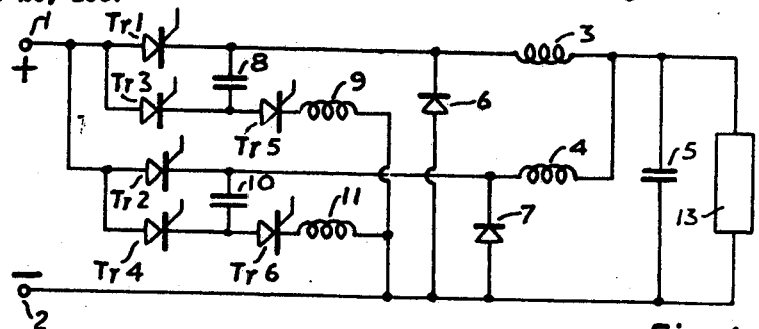

In order that the invention may be clearly understood and readily carried into effect, the same will be further described by way of example with reference to the accompanying drawings in which:

FIG. 1 illustrates a basic form of D.C. to D.C. converter employing the invention.

Figure 2:
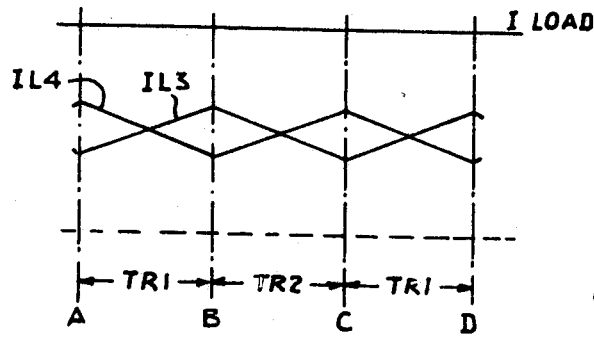
Figure 7:
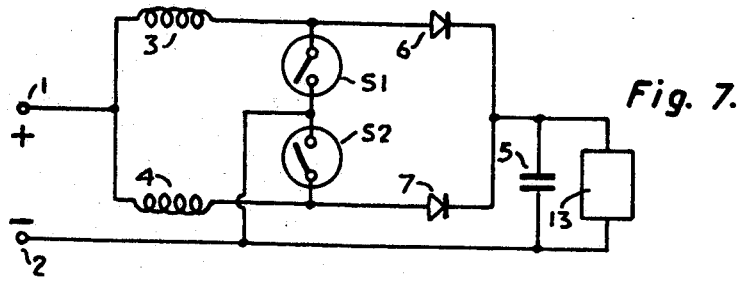
Figure 8:
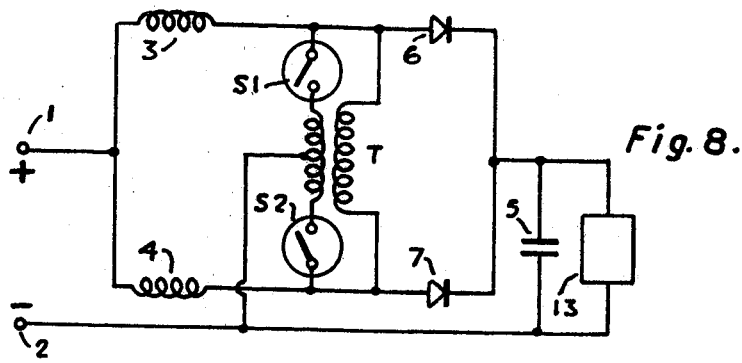
Figure 3:
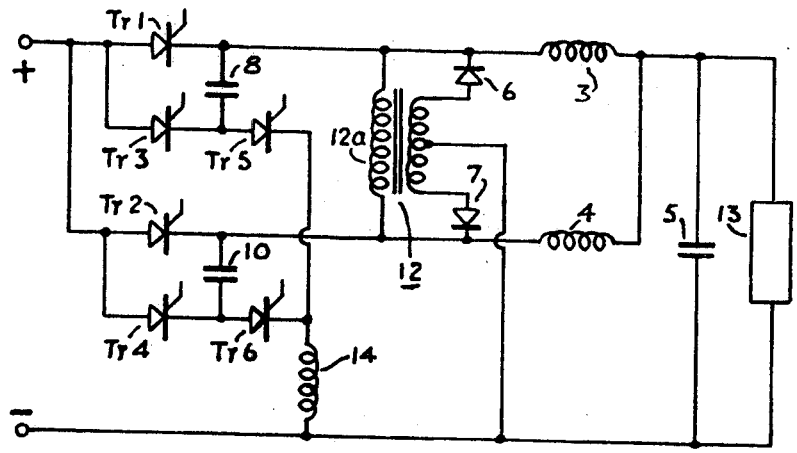
Figure 4:
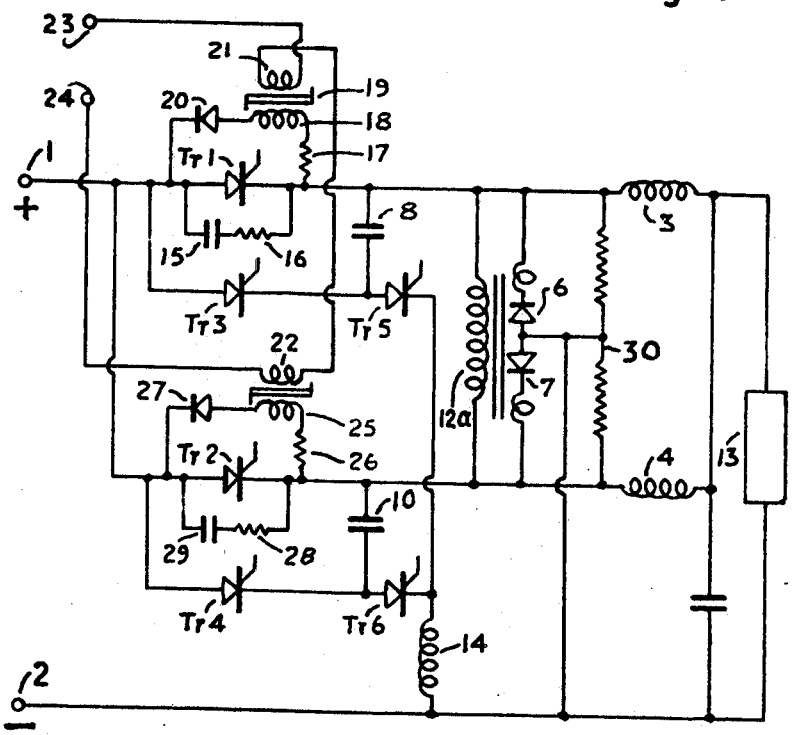
Figure 5:
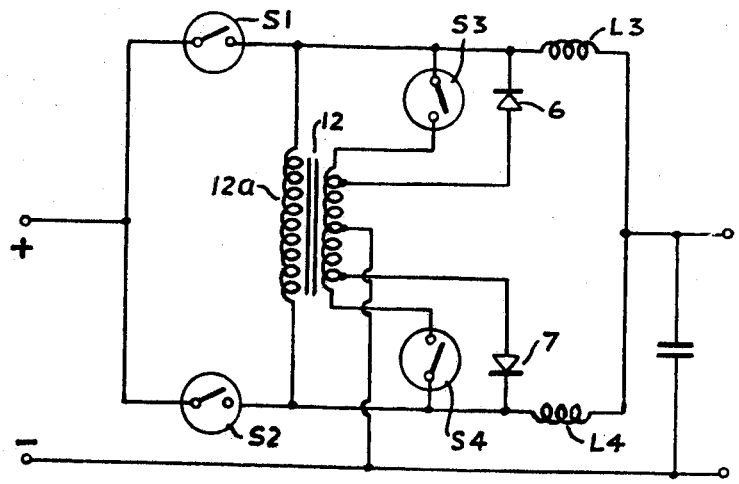
Figure 6:
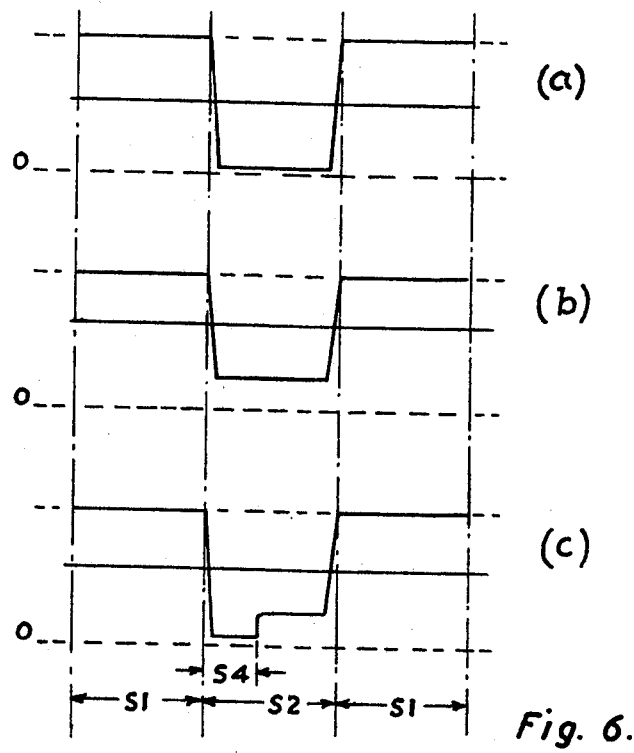

FIG. 2 illustrates waveforms to be referred to in connection with the operation of FIG. 1, FIG. 3 illustrates a D.C. to D.C. converter similar to that shown in FIG. 1 but modified to provide a boosted output voltage, FIG. 4 illustrates a modification of the circuit of FIG. 3 providing improved operation characteristics, FIG. 5 illustrates a modification of the basic circuit according to the invention providing means for regulating the output voltage;

FIG. 6 illustrates waveforms to be referred to in connection with the operation of the circuit of FIG. 5, and FIG. 7 and FIG. 8 illustrate basic circuits in accordance with the invention for providing output voltage in excess of the supply voltage.

In the circuit arrangement of FIG. 1 the supply terminals 1 and 2 have connected to them a D.C. source of the polarity shown. The terminal 1 is connected via a switching device in the form of a semiconductor controllable rectifier device TR1 to one terminal of an inductance 3, the other terminal of which is connected to the load 13. The terminal 1 is also connected via a further switching device in the form of a semiconductor controllable rectifier device TR2 to one terminal of a further inductance 4, the other terminal of which is also connected, along with the above-mentioned terminal of 3, to one terminal of the load 13. The other terminal of the load 13 is connected to the supply terminal 2 and across the output terminals of the circuit there is connected a smoothing capacitor 5. The respective first mentioned terminals of the inductances 3 and 4 are further connected via free-wheeling diodes 6 and 7 as shown to the line which is connected to the D.C. supply terminal 2. As will be seen hereafter, these paths enable continued conduction of current via the inductance 3 and 4 subsequent to disconnection of the respective inductances from the supply source.

The remaining components in the circuit consist of components which are provided purely for the commutation of the main semiconductor controllable rectifier devices TR1 and TR2. Considering the device TR1, a capacitor 8 is connectable across the device TR1 via a further semiconductor controllable rectifier device TR3 and the junction of TR3 and the capacitor 8 is connected via yet another semiconductor controllable rectifier device TR5 to the negative supply line via a charging inductance 9. A similar arrangement of components consisting of TR4, TR6, commutating capacitor 10 and inductance 11 are provided associated with the main semiconductor controllable rectifier device TR2.

A triggering circuit which is not shown is provided for applying triggering signals to the six controllable rectifier devices shown in the circuit of FIG. 1 in a suitable sequence such that the devices TR1 and TR2 are rendered conducting alternately for equal periods of time so that the source which is connected to the terminals 1 and 2 is conducting substantially continuously to the output circuit, this conduction taking place via the device TR1 or TR2 at any given time.

It will be appreciated that the semiconductor controllable rectifier devices TR1 to TR6 are semiconductor controllable rectifier devices of a type which, when rendered conducting, continue to conduct until the current therein is reduced to less than a sustaining value for a predetermined time. The purpose of the commutating circuits referred to above is therefore to reduce the current in the respective main devices at the appropriate instants, to less than the sustaining value of current.

For the purposes of comprehending the manner of operation of the circuit arrangement of FIG. 1, reference may be had to the waveforms of FIG. 2.

Ignoring the first few switching periods of the devices TR1 and TR2, during which the currents and voltages build up to their normal operating values, when the device TR1 is rendered conducting, the current in the inductance 3 follows a substantially linear portion of an exponential curve such as that between the instants A and B as shown by the curve IL3 in FIG. 2. At the same time as the device TR1 is rendered conducting, a triggering signal is applied to the device TR4 to render the device TR4 conducting to commutate the device TR2 into the non-conducting condition. At the same instant a triggering signal is also applied to TR5 to enable capacitor 8 to be charged via 9. The current in the inductance 4 therefore continues to flow via inductance the respective free-wheeling diode 7 and the current in this inductance follows a curve on the lines of the linear drop along the curve IL4 between A and B in FIG. 2. Similarly, on attainment of the instant B, the device TR1 is rendered non-conducting by the charge of capacitor 8 being the presented across it by triggering of the device TR3 and the device TR2 is rendered conducting such that the curve IL4 now follows a rising portion between B and C and a complementary falling portion is present for the curve IL3. TR6 is also triggered with TR2 to charge capacitor 10 via inductance 11 in readines for commutation of TR2 by triggering of TR4. Owing to the respective linear portions of the currents flowing in the inductances 3 and 4 as refererd to above, the load current is substantially constant and is sufficiently smoothed by a relatively small smoothing capacitor 5. Since the components are complementary, the overall ripple component in the output is relatively small.

In comparison with the circuit arrangement such as described above with reference to FIG. 1, a simple single sided D.C. chopper circuit with smoothing has the disadvantage of a discontinuous current being taken from the supply and also of requiring substantially larger smoothing components for smoothing the output ripple. Again, a standard form of parallel inverter employed for such conversion, by following it with a rectifier and suitable smoothing, although providing less ripple in the output than the simple single sided circuit, has the disadvantage of additional rectifier forward voltage drops and additional losses in the transformer which is necessary in such an inverter.

It will be appreciated that in the circuit arrangement of FIG. 1, the output voltage is approximately equal to half the supply voltage applied to the terminals 1 and 2. It may be, however, that the circuit arrangement is required to provide output voltage which is somewhat higher than half the supply voltage. In this case, a modified form of circuit such as illustrated in FIG. 3 may be employed. In the circuit arrangement of FIG. 3, the main components are substantially the same as described with reference to FIG. 1 but in addition, a boost transformer 12 is provided indicated by the general reference 12 and having a primary winding 12a connected across the cathodes of the main controllable rectifier devices TR1 and TR2 and having secondary winding sections included in series with the free-wheeling diodes 6 and 7 as shown. In addition, the inductances 9 and 11 are now combined into a single inductance 14 associated with both commutating circuits for the devices TR1 and TR2. This, however, does not substantially affect the basic operation of the circuit.

In operation of the circuit arrangement of FIG. 3, the devices TR1 and TR2 are again rendered conducting alternately in a similar manner to that described above with relation of FIGS. 1 and 2, and commutation of the devices is substantially as before. Operation of the boost transformer 12 can be considered as operation in the manner of an auto-transformer, the boost power being obtained from each secondary winding section of the transformer on alternate half cycles of the circuit when the respective free-wheeling diode 6 or 7 connected to the particular winding is conducting. The boost voltage which is added to the output voltage during each free-wheeling period therefor, is equal to the supply voltage multiplied by the number of turns on the respective secondary winding section and divided by the sum of the respective secondary winding section turns and primary winding turns. In practice, moreover, it may be necessary to provide resistors between the cathodes of TR1 and TR2 and the negative terminal 2 of the supply in order to provide a path for the sustaining currents of the controllable rectifier devices TR1 and TR2.

Since the switching devices TR1 and TR2 which are used in FIG. 1 and FIG. 3 are semiconductor controllable rectifier devices of the type referred to, which require a commutating capacitor for turning them off, this has an effect on the output voltage regulation characteristic of the converter when low load conditions are considered. This is due to the fact that during a commutation period for one of the switching devices, say TR1, the respective commutating capacitor 8, under low load conditions may not become fully discharged and therefore the output voltage tends to increase as load resistance is increased, and the circuit arrangement of FIG. 4 shows one manner of reducing this disadvantage. Further, another disadvantage, of allowing the discharge time of the commutating capacitor to increase under light load conditions, is that if the auxiliary commutating devices have not turned off at the end of a half period of operation, short-circuit paths may be established which cause the circuit to fail.

The circuit arrangement of FIG. 4 is again basically substantially the same as that of FIG. 3 but it will now be observed that in parallel with each of the main semiconductor controllable rectifier devices TR1 and TR2 there are a number of additional components. Taking the case in FIG. 4, of the main controllable rectifier device TR1, in parallel therewith is a series combination of a small capacitor 15 and a small resistor 16 for limiting voltage spikes, and also in parallel therewith is the series combination of a resistor 17, a winding 18 of saturable reactor 19 and a diode 20. The other winding of the saturable reactor 19, namely, winding 21, is connected in series with the corresponding winding of a similar saturable reactor associated with the other main controllable rectifier device TR2. This winding is represented by the reference 22. The series combination of the windings 21 and 22 is connected to an auxiliary D.C. supply source connected to the terminals 23 and 24. The remaining components associated with the switching device TR2 are substantially the same as those associated with TR1 and will not be discussed further. However, it may be noted that in FIG. 4 the above desirable high resistance mentioned with reference to FIG. 3, which is centre-tapped to the junction of the two diodes 6 and 7 and whose position is now reversed with relation to the transformer secondary windings, is now shown as the tapped resistance 30.

In operation of the circuit arrangement of FIG. 4, the auxiliary supply connected to the terminals 23 and 24 is so adjusted as to so bias the saturable reactors via the windings 21 and 22 that the pulse applied from the respective commutating capacitor across the device TR1 or TR2 is limited in its duration by the saturable reactor associated therewith becoming conducting after, say, 70 microseconds following initiation of conduction of the commutating device TR3 or TR4 as the case may be. This being so, after the expiration of the aforementioned period, any charge remaining on the commutating capacitor due to the load being of high resistance, is reversed via the respective saturable reactor and diode path, and the rise in mean output voltage which would otherwise be produced may be substantially reduced. The series resistors 17 and 26 in circuit with the respective saturable reactors 19 and 23, are provided in order to introduce losses into the discharging paths for the capacitors 8 and 9 via the respective saturable reactors, thereby preventing excessive build-up of commutating voltage on these capacitors from one conducting period to the next for the main device.

The diagrammatical circuit arrangement of FIG. 5 illustrates a further modification of the basic form of circuit arrangement the switching devices being shown as basic blocks S1 and S2 for simplicity. It will be appreciated, however, that in practice, these devices are preferably semiconductor controllable rectifier devices having a triggerable forward break-over characteristic and are provided with suitable triggering circuits and suitable means for commutating the conducting devices into the non-conducting condition such as shown in FIG. 1 or FIG. 4. In addition to the boost transformer 12 having a primary winding 12a and a secondary winding which is centre-tapped to the negative supply terminal, associated with this winding are further switching devices S3 and S4. These switching devices are connected to the terminals of the secondary windings and the free-wheeling diodes 6 and 7 are now connected to tappings spaced somewhat inwardly towards the centre tapping of the secondary winding of the transformer.

Assuming first of all that the devices S3 and S4 are not rendered conducting, the circuit of FIG. 5 operates substantially identically with that of FIG. 3, giving a boosted output voltage which is somewhat more than half of the supply voltage. If, however, switches S3 and S4 are rendered conducting at variable instants within the conducting periods of the free-wheeling diodes 6 and 7 respectively, a variable increase in the magnitude of the boost voltage produced by the transformer is produced as shown in the waveforms of FIG. 6. The waveforms of FIG. 6 show the voltage at the input to the inductance 3 under three different conditions. The waveform (a) shows the voltage applied to the inductance 3 as it would appear with a certain minimum boost EB1. The waveform at (b) shows the voltage applied to the inductance 3 with full boost EB1 and EB2 obtained with the switch S4 closed for the whole of the free-wheeling period. Lastly, the waveform (c) shows the voltage applied to the inductance 3 with the boost voltage increased stepwise from the minimum, during the period that S2 is open by suitably controlled operation of the switching device S4, at an intermediate instant during the free-wheeling current period for the inductance 3. The periods for which S1, S2 and S4 are conducting are indicated at the base of the diagram of FIG. 6.

Inasmuch as the operation of the voltage regulating circuit shown basically in FIG. 5 involves a departure from square wave conditions obtaining in the basic circuit, it introduces more additional ripple in the output and input circuits, but assuming the range of regulation required is small, the effect may not be particularly serious and may be largely off-set by a relatively small increase in the size of the smoothing components employed.

The circuit arrangements specifically described so far have been those of converters giving an output voltage in the region of half of the supply voltage, and the principal use of such a converter may be, for example, to obtain a supply voltage of about 28 volts from a 50 volt battery supply. It is, however, conceivable that other voltages may bt required from such a battery, and to ogtain voltages closer to other sub-multiples of a supply voltage by increasing the number of circuits with respective switching devices which are operated in turn. For example, if four switchnig devices are provided each with its associated smoothing inductance and free-wheeling diode path in an arrangement analogous to that of the circuit arrangement of FIGS. 1, 3, 4 or 5, and if the switches are controlled to close for 25% of the total duty cycle in sequence, an output voltage in the region of one-quarter of the input voltage may be obtained with similar benefits as those which may be obtained with the previously illustrated examples as regards minimal input and output ripple.

The present invention is also applicable as aforementioned, to conventers adapted to provide a voltage which is in excess of the supply voltage. A typical basic arrangement for obtaining this result is shown in the schematic diagram of FIG. 7. In FIG. 7 the switching devices are again represented as basic blocks S1 and S2, but it will be understood that these may be semiconductor controllable rectifier devices as employed in the described circuits or any other suitable form of switching device. The input terminals 1 and 2 are connected to the D.C. supply source, the positive terminal 1 having connected via an inductance 3 to one terminal of a first main switching device S1, to one terminal thereof being connected to the negative supply terminal 2. The positive supply terminal is also connected via a further inductance 4 to a terminal of a second main switching device S2 the other terminal of which is also connected to the negative supply terminal 2. The junction S1 and the choke 3 is connected moreover via a diode 6 to the positive terminal of a load 13. Similarly, the junction of S2 and the choke 4 is connected via a further diode 7 to the other terminal of the load 13, a smoothing capacitor 5 being connected across the load terminals.

In operation of the basic circuit of FIG. 7, again the switching devices S1 and S2 are rendered conducting alternately for equal periods, and whilst the switch S1 is conducting, current flows from the supply terminals 1 and 2 directly into choke 3, and when the device S1 becomes non-conducting, a free-wheeling current flows via the diode 6 to the output capacitor and the load. By the same reasoning that has been applied to the voltage-reducing converters discusssed previously, the ripple current components in the two inductors 3 and 4 largely cancel out in the input circuit, whilst the ripple in the output for a given smoothing capacitor is very substantially less than that which is produced by a converter employing only one switching device and associated inductance and free-wheeling paths.

Analogously with the voltage-reducing converters described with reference to FIGS. 3 and 4, a boost transformer may be incorporated in a converter of the type shown in FIG. 7. This is illustrated in FIG. 8 which is similar to FIG. 7, the same reference numerals being used where appropriate, but it will be noted that the switches S1 and S2 are now connected via a transformer winding the centre tap of which now provides the connection to the negative supply line, and the secondary winding of the transformer being connected across the anodes of the free-wheeling diodes 6 and 7. Again, similarly to the voltage-reducing converters where sub-multiples of an input voltage may be obtained, multiples of an input voltage may be obtained by multiplication of the number of switching devices with associated inductance and free-wheeling current paths arranged in the manner of FIG. 7 and timed to conduct in sequence. Such arrangements may provide multiples of the input supply voltage with minimal ripple and therefore minimal necessary smoothing components both for the input and the output of the circuit.

In the above discussed circuits of FIGS. 3, 4, 5 and 8, which provide for boosting of the output voltage of the converter, it may readily be appreciated that if the boost transformer windings are connected in an alternative sense they may provide for a degree of bucking to effectively provide a reduction of output voltage.

Also, variable degrees of boost may be achieved by varying the turns ratios in the transformer means which are utilized at any given period of the operating cycle. The ratio of transformer T in FIG. 8 may be made variable by providing further switch means similar to S1 and S2 but connected to tappings on the associated transformer primary windings, the switching means being operated at desired instants in the operating cycle to provide a step-boost characteristic on the lines already discussed with reference to FIG. 6.

Whilst in the foregoing, particular forms of switching devices, namely, semiconductor controllable rectifier devices, have been proposed, the invention is in no way limited to such devices. Further, whilst in the specific form of circuits which have been proposed herein, a particular form of commutation circuit has been employed throughout, the invention is in no way limited to the use of this particular form of commutation circuit. Indeed, other forms of commutation circuit such as described, for example in the specification of United States Patent No. 3,242,352 may be employed.

Having thus described our invention, what we claim is:

1. A D.C. to D.C. voltage converter circuit comprising direct current supply terminals, output terminals to which a load may be connected, a plurality of inductances, at least first and second switching means for permitting alternate switching of respective of said inductances in respective series paths across said direct current supply terminals, free-wheeling paths for enabling continued current flow in respective of said inductances upon disconnection of that inductance from said supply terminals, and means for rendering a previously non-conductive one of said switching means conductive closely following the rendering of a prepiously conductive one of said switching means non-conductive such that the rising output ripple voltage component at said output terminals produced by said previously non-conductive switching means being rendered conductive is accompanied by a substantially complementary falling output ripple voltage component produced by said previously conducting switching means being rendered non-conductive.

2. A converter circuit as claimed in claim 1 wherein said output terminals are included in said series paths and said free-wheeling paths.

3. A voltage converter circuit as claimed in claim 2, including transformer means having winding sections connected in current paths to the output terminals to boost or buck the output voltage.

4. A voltage converter circuit as claimed in claim 3, the transformer means having primary winding turns connected in a path between the output sides of two said switching means and secondary winding turns connected in the corresponding free-wheeling paths.

5. A voltage converter circuit as claimed in claim 2, a resistive current path being connected from the output side of each said switching means back to the supply to provide paths for sustaining currents in the switching means.

6. A voltage converter circuit as claimed in claim 1, the switching means comprising semiconductor controllable rectifier devices having a triggerable forward break-over characteristic.

7. A voltage converter circuit as claimed in claim 6, each switching means being provided with commutation circuit means including a commutating capacitor connectable in a charged condition across the respective switching means to render it non-conducting, a current path being provided via which after a predetermined time following such connection, said capacitor may be discharged via other than a load connected to the output terminals to reduce load voltage regulation due to the capacitor voltage.

8. A voltage converter circuit as claimed in claim 7, the last mentioned current path being provided by a saturable reactor in series with a unilaterally conductive device, the saturable reactor being suitably biased to be non-conducting for a predetermined time.

9. A voltage converter circuit as claimed in claim 4 wherein different numbers of secondary winding turns are connected in different corresponding free-wheeling paths, the free-wheeling paths being selectively operable at predetermined instants in the operating cycle of the circuit.

10. A D.C. to D.C. voltage converter circuit comprising direct current supply terminals, output terminals to which a load may be connected, a plurality of inductances, at least first and second switching means for permitting alternate switching of respective of said inductances in respective series paths across said direct current supply terminals, free-wheeling paths for enabling continued current flow in respective of said inductances upon disconnection of that inductance from said supply terimnals, said respective free-wheeling paths including said direct current supply terminals and said output terminals and said respective switching means, when conductive, conducting current through respective paths which by-pass said output terminals, and means for rendering a previously non-conductive one of said switching means conductive closely following the rendering of a previously conductive one of said switching means non-conductive such that the rising voltage component in the input of said circuit produced by said previously non-conductive switching means being rendered conductive is accompanied by a substantially complementary falling voltage component produced by said previously conductive switching means being rendered non-conductive.

11. A voltage converter circuit as claimed in claim 10 further comprising transformer means having winding sections connected in current paths to said output terminals to boost or buck the output voltage, said transformer means including secondary winding turns connected in a current path between the input sides of said first and second switching means and respective primary winding turn connected in series with said first and second switching means.

12. A voltage converter circuit as claimed in claim 11 wherein different numbers of primary winding turns are connected in series with different corresponding switching means, said switching means being selectively operable at predetermined instants in the operating cycle of the circuit.

References Cited

UNITED STATES PATENTS

| | | | |
|---|---|---|---|
| 3,082,369 | 3/1963 | Landis | 321—45 |
| 3,300,706 | 1/1967 | Wellford | 321—43 |
| 3,303,406 | 2/1967 | Bedford | 321—44 |
| 3,321,697 | 5/1967 | Etter | 321—45 |
| 3,328,721 | 6/1967 | Hehenkamp et al. | 331—62 |
| 3,334,291 | 8/1967 | Hehenkamp | 321—44 |
| 3,366,866 | 1/1968 | King | 321—45 X |

LEE T. HIX, Primary Examiner

W. M. SHOOP, Jr., Assistant Examiner

U.S. Cl. X.R.

321—43; 323—22